United States Patent [19]

Iwagami

[11] Patent Number: 4,594,598

[45] Date of Patent: Jun. 10, 1986

[54] PRINTER HEAD MOUNTING ASSEMBLY IN AN INK JET SYSTEM PRINTER

[75] Inventor: Fusao Iwagami, Nara, Japan

[73] Assignee: Sharp Kabushiki Kaisha, Osaka, Japan

[21] Appl. No.: 543,605

[22] Filed: Oct. 20, 1983

[30] Foreign Application Priority Data

Oct. 26, 1982 [JP] Japan ............................... 57-188457

[51] Int. Cl.[4] ............................................ G01D 15/16

[52] U.S. Cl. ............................................ 346/140 R

[58] Field of Search ................. 346/140 PD; 400/126; 346/75

[56] References Cited

U.S. PATENT DOCUMENTS 4,080,607 3/1978 Van Breemen ....................... 346/75

4,367,482 1/1983 Heinzl .......................... 346/140 PD

OTHER PUBLICATIONS

IBM Tech. Disc. Bul., Holecek & Kotasek, Ink Jet Aiming Device, vol. 16, No. 7, Dec. 1973, pp. 2237-2238.

*Primary Examiner*—E. A. Goldberg

*Assistant Examiner*—Mark Reinhart

*Attorney, Agent, or Firm*—Birch, Stewart, Kolasch & Birch

[57] ABSTRACT

A multi-color ink jet system printer includes a printer head mounted on a carriage which is driven to travel in front of the platen in the lateral direction. The printer head includes a nozzle unit having a plurality of orifices aligned in a matrix fashion. A printer head inclination adjusting assembly is provided for accurately adjusting the row of matrix aligned orifices to parallel the lateral direction.

2 Claims, 12 Drawing Figures

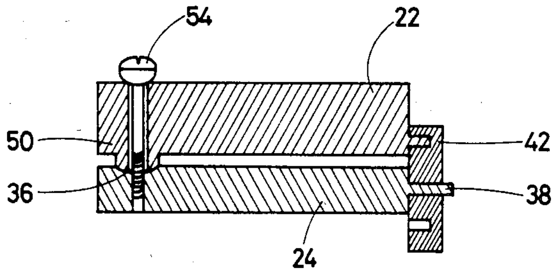
FIG.9
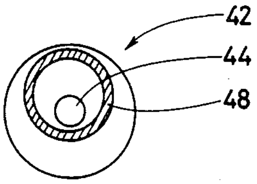
FIG.10
FIG.11
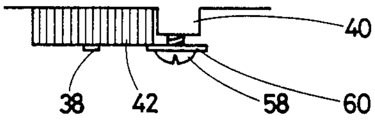
FIG.12
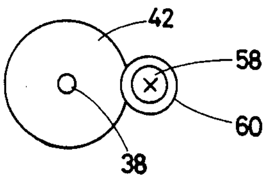

PRINTER HEAD MOUNTING ASSEMBLY IN AN INK JET SYSTEM PRINTER

BACKGROUND AND SUMMARY OF THE INVENTION

The present invention relates to an ink jet system printer which includes a printer head having a multi-orifice nozzle. The present invention relates, more particularly, to a mounting assembly of a printer head in a color ink jet system printer of the ink-on-demand type.

Generally, an ink jet system printer of the ink-on-demand type includes a printer head mounted on a carriage. The printing operation is conducted while the carriage travels in the lateral direction. In the color ink jet system printer, at least four orifices are aligned in the lateral direction, each orifice emitting different color ink. In such a color ink jet system printer, if the orifices are not accurately aligned in the lateral direction, an accurate printing can not be conducted because different color ink is not precisely superimposed on each other at a selected printing position. In the conventional ink jet system printer, the printer head is tightly fixed to the carriage and, therefore, the adjustment is very difficult.

Accordingly, an object of the present invention is to provide a color ink jet system printer which ensures an accurate, clean printing.

Another object of the present invention is to provide an adjusting mechanism for adjusting the mounting inclination of the printer head on a carriage in an ink jet system printer.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, one edge of the printer head is rotatably supported by a carriage. A cam mechanism is secured to the other edge of the printer head. By rotating the cam mechanism, the printer head rotates about one edge so that the inclination of the printer head is adjusted.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIG. 9 is a sectional view taken along line IX—IX of FIG. 8;

FIG. 10 is a plan view of an eccentric cam included in the printer head mounting assembly of FIG. 8;

FIG. 11 is a plan view showing a cam locking mechanism included in the printer head mounting mechanism of FIG. 8; and FIG. 12 is a front view of the cam locking mechanism of FIG. 11.

DESCRIPTION OF THE PREFERRED EMBODIMENTS

Figure 1:
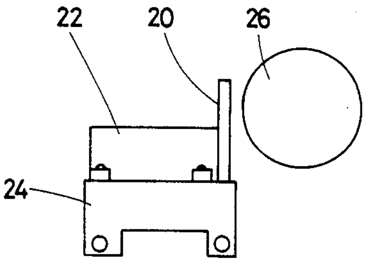
FIG.1 PRIOR ART
FIG. 1 is a schematic side view showing a general construction of a printer head in a color ink jet system printer of the ink-on-demand type of prior art.

FIG. 1 schematically shows a general construction of a color ink jet system printer of the ink-on-demand type. A printer head includes a nozzle unit 20 and an ink liquid reservoir 22 integrally connected to the nozzle unit 20. The printer head is mounted on a carriage 24 which is driven to travel in the lateral direction in front of a platen 26. That is, the nozzle unit 20 confronts a record receiving paper supported by the platen 26 and travels in the lateral direction as the carriage 24 travels in the lateral direction.

Figure 2:
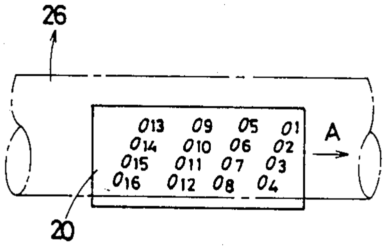
FIG. 2 is a schematic front view showing orifice alignment in the color ink jet system printer of the ink-on-demand type.
Figure 3:
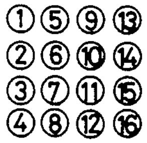
FIG. 3 is a schematic plan view showing an accurate printing condition in the color ink jet system printer of the ink-on-demand type.

The nozzle unit 20 is provided with sixteen (16) orifices aligned in a 4×4 matrix fashion as shown in FIG. 2. Each column ((1, 2, 3, 4); (5, 6, 7, 8); (9, 10, 11, 12); and (13, 14, 15, 16)) is inclined by a predetermined angle with respect to the perpendicular line to the scanning lateral direction (shown by arrow A). FIG. 3 shows a desirable dot position on the record receiving paper, each dot position number corresponding to the orifice number of the nozzle unit 20.

Figure 4:
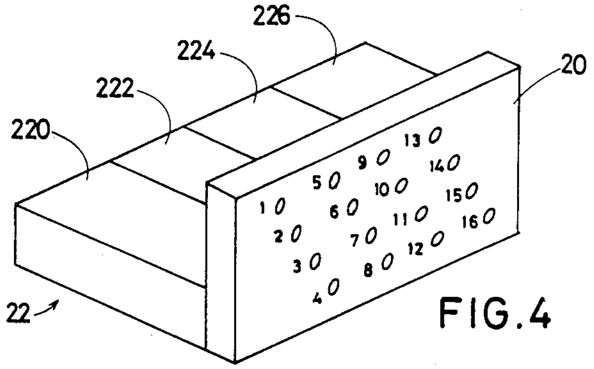
FIG. 4 is a perspective view of a printer head of a color ink jet system printer of the ink-on-demand type.

To perform the color printing, the first group of orifices (1, 2, 3, 4) are communicated to a first ink tank 220 which is included in the ink liquid reservoir 22 and contains yellow ink. The second group of orifices (5, 6, 7, 8) are communicated to a second ink tank 222 which is included in the ink liquid reservoir 22 and contains magenta ink. The ink liquid reservoir 22 includes a third ink tank 224 containing cyan ink, the third ink tank 224 communicating to the third group of orifices (9, 10, 11, 12). The fourth group of orifices (13, 14, 15, 16) are communicated to a fourth ink tank 226 which is included in the ink liquid reservoir 22 and contains black ink as shown in FIG. 4.

Figure 5:
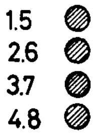
FIG. 5 is a schematic plan view for explaining a desirable printout in a color ink jet system printer.

The multi-color printing is carried out by superimposing two or more ink droplets. FIG. 5 shows a printout of red dots which are obtained by superimposing magenta droplets (5, 6, 7, 8) on the yellow droplets (1, 2, 3, 4).

An example of a control system of the multi-color ink jet system printer of the ink-on-demand type is described in copending application, "COLOR INK JET SYSTEM PRINTER", Ser. No. 488,827, filed on Apr. 26, 1983 by Yoshio KANAYAMA and assigned to the same assignee as the present application. The German counterpart is P No. 33 15 514.3 filed on Apr. 29, 1983.

In such a color ink jet system printer, each row ((1, 5, 9, 13); (2, 6, 10, 14); (3, 7, 11, 15); and (4, 8, 12, 16)) must be accurately aligned in the lateral direction in order to ensure an accurate, clean printing.

Figure 6:
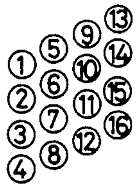
FIG. 6 is a schematic plan view showing an undesirable printing condition in the color ink jet system printer of the ink-on-demand type.
Figure 7:
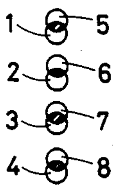
FIG. 7 is a schematic plan view for explaining an undesirable printout in a color ink jet system printer.

If the printer head is inclined from the scanning, lateral direction on the carriage 24, the dot position alignment on the record receiving paper may incline as shown in FIG. 6. This inclination precludes proper superimposing of different color ink in the multicolor printing. FIG. 7 shows an undesirable condition in the multicolor printing, wherein the magenta droplets (5, 6, 7, 8) are not accurately superimposed on the yellow ink droplets (1, 2, 3, 4).

Figure 8:
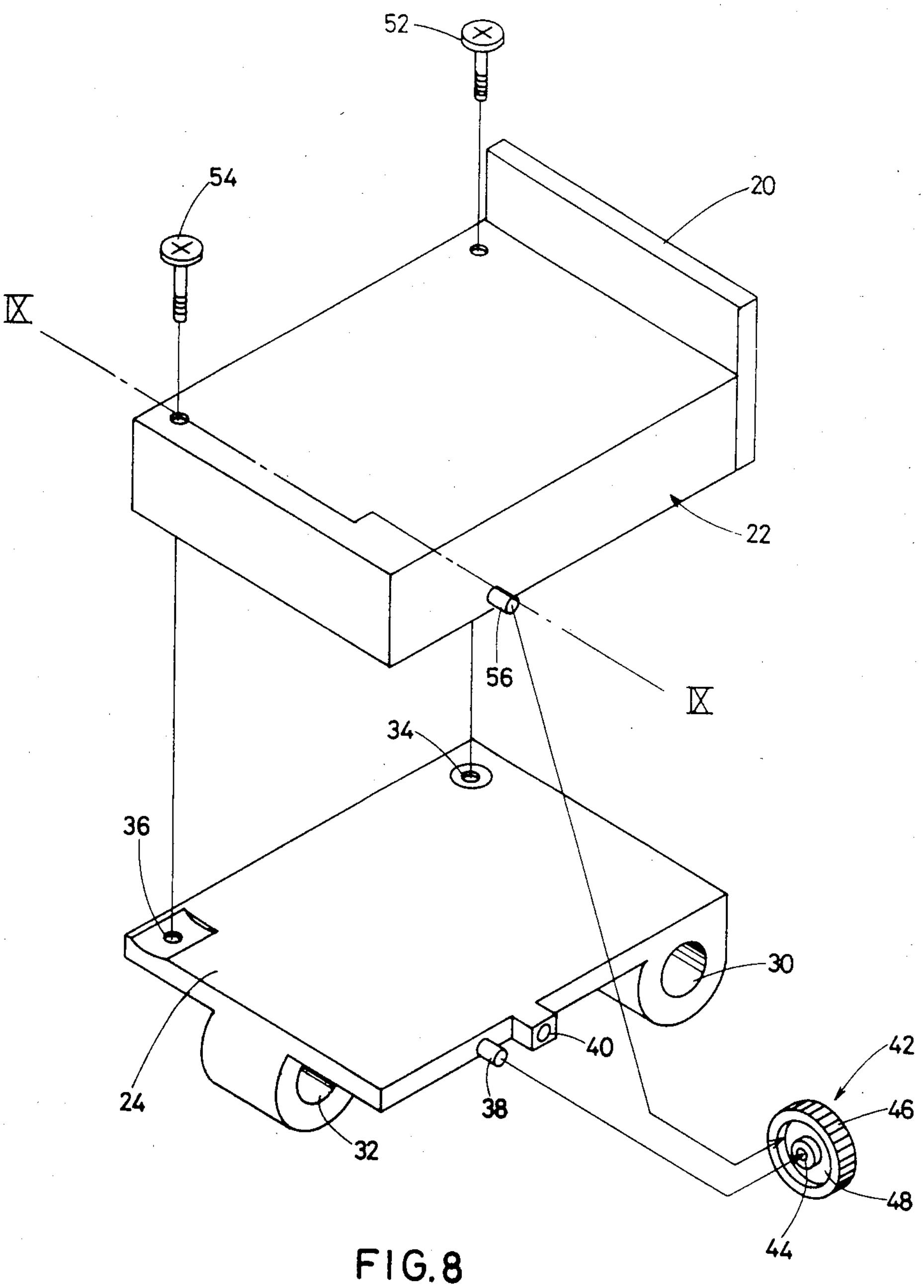
FIG. 8 is an exploded perspective view of an embodiment of a printer head mounting assembly of the present invention.

FIG. 8 shows an embodiment of a printer head mounting assembly of the present invention. Like elements corresponding to those of FIG. 1 are indicated by like numerals.

The carriage 24 is provided with a pair of bearings 30 and 32 which are slidably engaged to a pair of slidable shafts disposed along the platen 26. The carriage 24 is connected to a drive mechanism via a wire so that the carriage 24 travels on the slidable shafts in the lateral direction. A spherical sheet 34 is formed in the upper surface of the carriage 24 at the front/left corner thereof. A cylindrical sheet 36 is formed in the upper surface of the carriage 24 at the back/left corner thereof. On the right edge of the carriage 24, a cam shaft 38 and a protrusion 40 are formed. The protrusion 40 is provided with a screwed hole formed therein.

An eccentric cam 42 is rotatably secured to the cam shaft 38 through the use of a bearing opening 44 formed in the eccentric cam 42. Grooves are formed in a periphery 46 of the eccentric cam 42 in order to facilitate the manual rotation of the eccentric cam 42. A cam guide groove 48 is formed in one surface of the eccentric cam 42.

As already discussed above, the printer head includes the nozzle unit 20 and the ink liquid reservoir 22 integrally connected to the nozzle unit 20. On the under surface of the ink liquid reservoir 22, a spherical protrusion is formed at a position corresponding to the spherical sheet 34 formed on the carriage 24, and a cylindrical protrusion 50 (see FIG. 9) is formed at a position corresponding to the cylindrical sheet 36 on the carriage 24. A screw 52 is inserted through the spherical protrusion to reach the spherical sheet 34 in order to secure the printer head to the carriage 24. Furthermore, another screw 54 is inserted through the cylindrical protrusion 50 to reach the cylindrical sheet 36 in order to secure the printer head to the carriage 24.

An actuator 56 is provided on the right edge of the ink liquid reservoir 22 at a position corresponding to the cam shaft 38 formed on the right edge of the carriage 24. The actuator 56 is accommodated in the cam guide groove 48 when the eccentric cam 42 is secured to the cam shaft 38.

FIG. 9 shows a condition where the printer head is mounted on the carriage 24. The cylindrical protrusion 50 (the spherical protrusion) is accommodated in the cylindrical sheet 36 (the spherical sheet 34). The left end of the printer head is secured to the carriage 24 through the use of the screws 52 and 54, and the right edge of the printer head is supported on the carriage 24 through the use of the cam mechanism which includes the eccentric cam 42, the cam shaft 38, and the actuator 56.

FIG. 10 shows the configuration of the cam guide groove 48 formed in the eccentric cam 42. When the eccentric cam 42 is manually rotated under the condition where the printer head is loosely secured to the carriage 24 by the screws 52 and 54, the right end of the printer head is slided up and down on the carriage 24 because the actuator 56 follows the cam guide groove 48. That is, the printer head rotates about the spherical sheet 34 and the cylindrical sheet 36. In this way, the inclination of the printer head in the scanning lateral direction is adjusted.

When the inclination adjusting operation is completed, the screws 52 and 54 are completely rotated to tightly secure the printer head on the carriage 24. Furthermore, the eccentric cam 42 is fixed through the use of a screw 58 and a washer 60, the screw 58 being associated with the screwed hole formed in the protrusion 40. FIGS. 11 and 12 show a condition where the eccentric cam 42 is fixed by means of the screw 58 and the washer 60. That is, the right end of the printer head is tightly fixed through the use of the eccentric cam 42, the screw 58 and the washer 60 after the inclination of the printer head is adjusted.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An ink jet system printer comprising:

a printer head including a nozzle unit in a front face thereof, said nozzle having at least two orifices aligned in the lateral direction;

a carriage supporting said printer head;

drive means for shifting said carriage in said lateral direction;

support means for rotatably supporting one edge of said printer head on said carriage, said support means including a cylindrical sheet formed on said carriage, a cylindrical protrusion formed on an undersurface of said printer head at a position corresponding to said cylindrical sheet, a spherical sheet formed on said carriage and laterally opposed to said cylindrical sheet, and a spherical protrusion formed on an undersurface of said printer head at a position corresponding to said spherical sheet;

adjusting means provided on the opposing edge of said printer head for adjusting the inclination of said printer head on said carriage for accurately aligning said at least two orifices in said lateral direction, said adjusting means including a variable radius cam rotatably secured to said carriage on a cam shaft thereof and a cam actuator secured to said printer head, wherein said variable cam interacts with said cam actuator to accurately align said at least two orifices in said lateral direction; and locking means for locking said adjusting means, wherein said locking means is operable independently of said adjusting means.

2. The ink jet system printer of claim 1, wherein said nozzle unit includes a plurality of orifices arranged in a matrix, the row direction of said matrix being parallel to said lateral direction, and wherein said adjusting means accurately aligns said row in said lateral direction for accurately superimposing two or more colored ink droplets during a printing operation.

* * * * *